United States Patent [19]

Wolowski et al.

[11] Patent Number: 4,555,325

[45] Date of Patent: Nov. 26, 1985

[54] METHOD FOR INTERCONNECTING THERMALLY AND PRESSURE-STRESSED MULTI-PHASE REACTORS

[75] Inventors: Eckard Wolowski, Mülheim; Frank Mirtsch, Bottrop, both of Fed. Rep. of Germany

[73] Assignee: Ruhrkohle Aktiengesellschaft, Essen, Fed. Rep. of Germany

[21] Appl. No.: 626,183

[22] Filed: Jun. 29, 1984

[30] Foreign Application Priority Data

Jul. 2, 1983 [DE] Fed. Rep. of Germany ....... 3323885

[51] Int. Cl.$^4$ .......................... C10G 1/00; C10G 1/06; F28D 21/00; B01J 1/20
[52] U.S. Cl. .................................. 208/10; 208/8 LE; 422/202; 422/208; 422/241; 422/242
[58] Field of Search ............... 208/8 LE, 10; 422/241, 422/242, 202, 208

[56] References Cited

U.S. PATENT DOCUMENTS

| | | | |
|---|---|---|---|
| 1,835,425 | 12/1931 | Pier | 208/10 |
| 1,894,257 | 1/1933 | Pier et al. | 208/10 |
| 2,525,276 | 10/1950 | Shapleigh | 422/202 X |
| 3,520,794 | 7/1970 | Gatsis | 208/8 LE |
| 3,751,228 | 8/1973 | Semenov | 422/202 X |
| 4,164,441 | 8/1979 | Kühnlein et al. | 423/531 X |
| 4,229,419 | 10/1980 | Haese | 422/208 X |
| 4,235,841 | 11/1980 | Zimmerman | 422/208 X |
| 4,343,626 | 8/1982 | Peise et al. | 422/202 X |
| 4,345,988 | 8/1982 | Koch | 208/8 LE |
| 4,357,305 | 11/1982 | Loo | 422/241 |
| 4,454,240 | 6/1984 | Garguli | 208/10 |

FOREIGN PATENT DOCUMENTS 490558 1/1930 Fed. Rep. of Germany .
54994 4/1967 German Democratic Rep. .

*Primary Examiner*—D. E. Gantz
*Assistant Examiner*—William G. Wright
*Attorney, Agent, or Firm*—Nils H. Ljungman

[57] ABSTRACT

The invention provides pressure protection for the interior casing of hydrogenation reactors by the use of a manifold interconnecting the annular chambers of the aforesaid reactors with the processed-gas vapor path whereby process-conditioned pressure changes generated during the reaction process are simultaneously balanced. As a result, the interior casings of the reactors which define the reaction vessel can be made of relatively thin material as compared to conventional reaction vessels.

4 Claims, 4 Drawing Figures

METHOD FOR INTERCONNECTING THERMALLY AND PRESSURE-STRESSED MULTI-PHASE REACTORS

BACKGROUND OF THE INVENTION

1. Field of the Invention

The present invention relates to the interconnection of pressure reactor vessels in accordance with the principle of floating interior vessel casings for thermally and pressure-stressed processes, in which are introduced multi-phase reaction mixtures comprising gases, liquid and solid particles. More particularly, the invention is directed to an improvement in coal hydrogenation reactors in the sump phase.

2. Description of Prior Art

Typically, conventional reactors, which are employed in the hydrogenation of coal, are provided with a brick lining in order to keep the external pressure supporting casing of the reactor at a low temperature. This technique has proven to be disadvantageous, due to the fact that in the event of a rapid decrease in reactor's pressure, the porous brick work can be damaged or destroyed.

However, in chemical reactions which take place at high pressures and high temperatures, the use of the concept of the floating interior casing in a reactor has proven to be successful. According to this technique, in order to be able to withstand the high temperature and corrosive environment, the reactor's inner casing comprises temperature and corrosion resistant material. The process pressure is transmitted to the reactor's exterior casing which is at a lower temperature level relative to the internal casing which defines the reactor vessel. This is accomplished by means of a gaseous or liquid medium which is disposed in the annular space defined between the interior reactor casing and external reactor casing. This supporting medium transmits the interior pressure to the exterior pressure bearing casing, thus producing a temperature drop between the interior and exterior casings. The use of the floating interior, as compared with a solid wall reactor, provides the further benefit in that the reactor's interior and exterior casings can be made relatively thin and thus can be produced at a lower cost. An important prerequist for the use of such reactors is the presence of an equalization or balance of pressure between the internal chamber and the supporting medium in the annular space. This pressure equalization must also be ensured both for the non-stationary process conditions, such as, for example, the start-up and load change, as well as for emergency situations such as a rapid drop in pressure or a rapid passage of heat through the reactor. Should the reaction constituents in the reactor vessel form a multi-phase mixture which is capable of blocking the annular space, as for example, coking in the case of coal or heavy oil hydrogenation, care must be taken to ensure that this reaction mixture does not enter into the annular space.

Several techniques are known by which the pressure equalization can be obtained. For example, it is known to employ a liquid supporting medium which does not correspond to the chemical composition of the reaction constituents and which is separated from the reaction constituents by means of a gas cushion or barrier in the equalizing pipe line and the equalizing chamber. Such a technique is disclosed by German Pat. No. 490 558. It is also known, in the case of rapid drops in pressure at the reactor's outlet, to provide an additional connecting pipe with a non-return valve between the liquid support medium and the outlet to the reactor, in order to ensure a rapid equalization in pressure between the interior and exterior reactor casing. This technique is taught by German Pat. No. 15 42 005. In those processes in which the reactor constituents comprise a single or two-phase system, that is, a gas/liquid system, it is additionally known to employ part of the gaseous reaction constituent as a supporting medium. According to this technique, at the pressure side of of the gas-circulating compressor, a quantity of cold gas is extracted as a partial stream from the gas circuit and fed by means of a control device into the annular space defined between the reactor's casings. The gaseous partial stream, by flowing through this annular space, becomes heated almost to the temperature of the reaction and simultaneously serves to provide the required pressure equalization. Such a technique is taught by German Democratic Republic (DDR) Pat. No. 54 994. Through the aforedescribed technique, it is possible to dispense with the precautions required for sealing, such as would be required for the purpose of equalizing the thermal expansion between the interior and exterior casings with the use of a separate supporting medium.

While the aforedescribed techniques can be employed under certain conditions and for specific processes, high pressure reactor operations pose a unique series of problems. For example, the technique taught by the above-cited German Democratic Republic (DDR) Pat. No. 54 994 cannot be employed with a mixture of gaseous, liquid and solid reaction constituents because, between the annular space and the interior chamber of a reactor vessel, there is a direct connection through which solids containing reaction products could arrive in the annular space and could partially or completely block this annular space over a period of time. An example of this occurs during coking through hydrogenation in the sump phase. In such a case, uniform cooling of the exterior pressure supporting reaction casing would no longer be ensure. Additionally, consideration must be given to the fact that the partial stream drawn off from the gas circuit must be fed in the reactor's annular space via a control device. This control device could become a liability within the entire reaction process.

Furthermore, the use of these techniques, taught by either German Pat. No. 490 558 or German Pat. No. 15 42 005, which have a continuous flow through a multi-phase reactor, which reactor's constituents, for example, tend to form a coke, cannot be effectuated without serious and extensive modifications. For this purpose, it would be necessary to have a gas carrying, pressure equalizing pipe from the reaction medium to the supporting medium in the annular space. However, such an equalizing pipe can become blocked if the pressure equalizing pipe is not continuously flushed out by means of a controlled gas flush. The use of such a controlled gas flush is obviously expensive and susceptible to severe maintenance problems.

OBJECT OF THE INVENTION

It is, therefore, an object of the present invention to provide an improvement to thermally and pressure-stressed multi-phase reactors operating in accordance with principle of the floating interior casing, as for example, in the sump phase hydrogenation process, whereby it is possible to prevent blocking of the annular space as well as completely dispensing with expensive and trouble-prone auxiliary equipment.

SUMMARY OF THE INVENTION

The invention resides broadly in a coal hydrogenation process in which multi-phase reaction products flow through at least one reactor and are then cooled in a separator having a first output of a first phase comprising solids and condensed reaction products and a second output of a second phase comprising residual gas and vapors, said at least one reactor and precipitator each comprising an internal casing which forms a reaction chamber, an external pressure casing in a spaced relation with the internal casing and defining therebetween a generally annular chamber having a pressure medium disposed therebetween, the improvement comprising the step of interconnecting the annular chamber of each said reactor and precipitator via a manifold with the first output of the first phase of the precipitator in order to establish pressure equilibrium between the annular chambers and the reaction chamber.

BRIEF DESCRIPTION OF THE DRAWINGS

The above, as well as other features and advantages of the present invention, will become apparent through consideration of the detailed description of the invention in conjunction with the following drawings in which.

DESCRIPTION OF THE PREFERRED EMBODIMENTS

Figure 2:
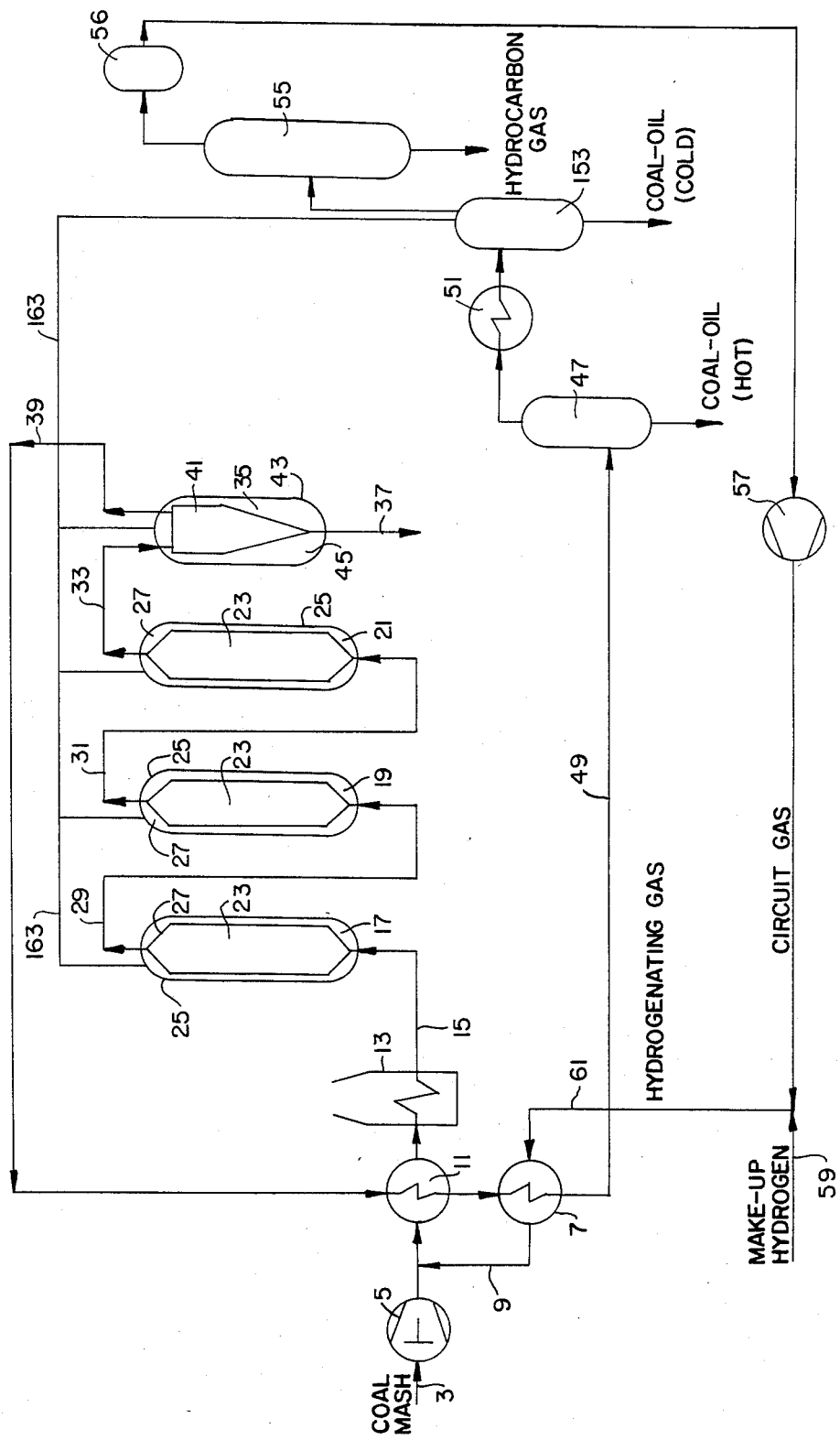
FIG. 2 is a flow diagram of a coal-oil installation demonstrating an alternative embodiment of the invention.
Figure 3:
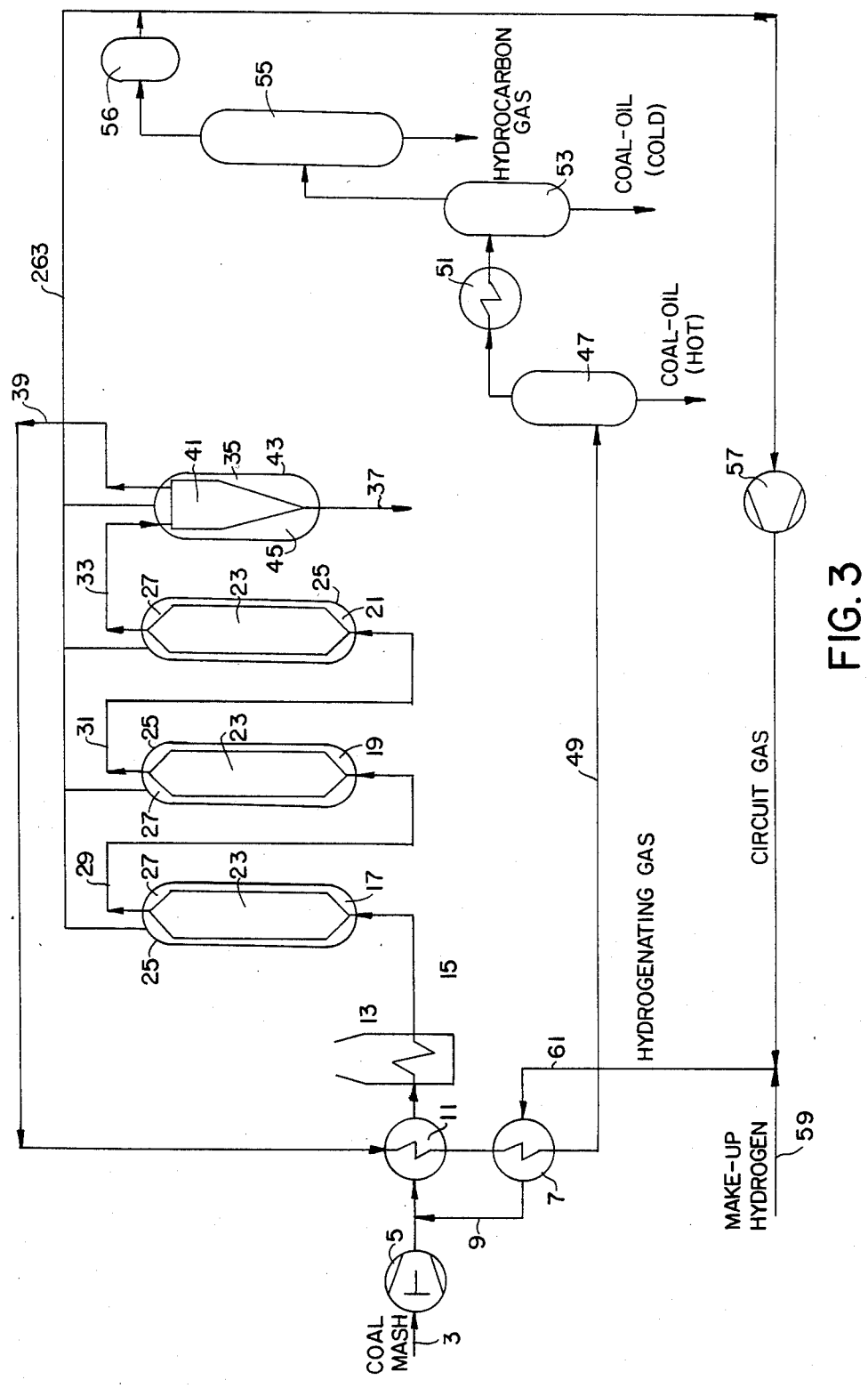
FIG. 3 is a flow diagram of a coal-oil installation demonstrating a second alternative embodiment of the invention, FIG. 4. is a flow diagram of a coal-oil installation incorporating a third alternative all according to the teaching of the invention.
Figure 4:
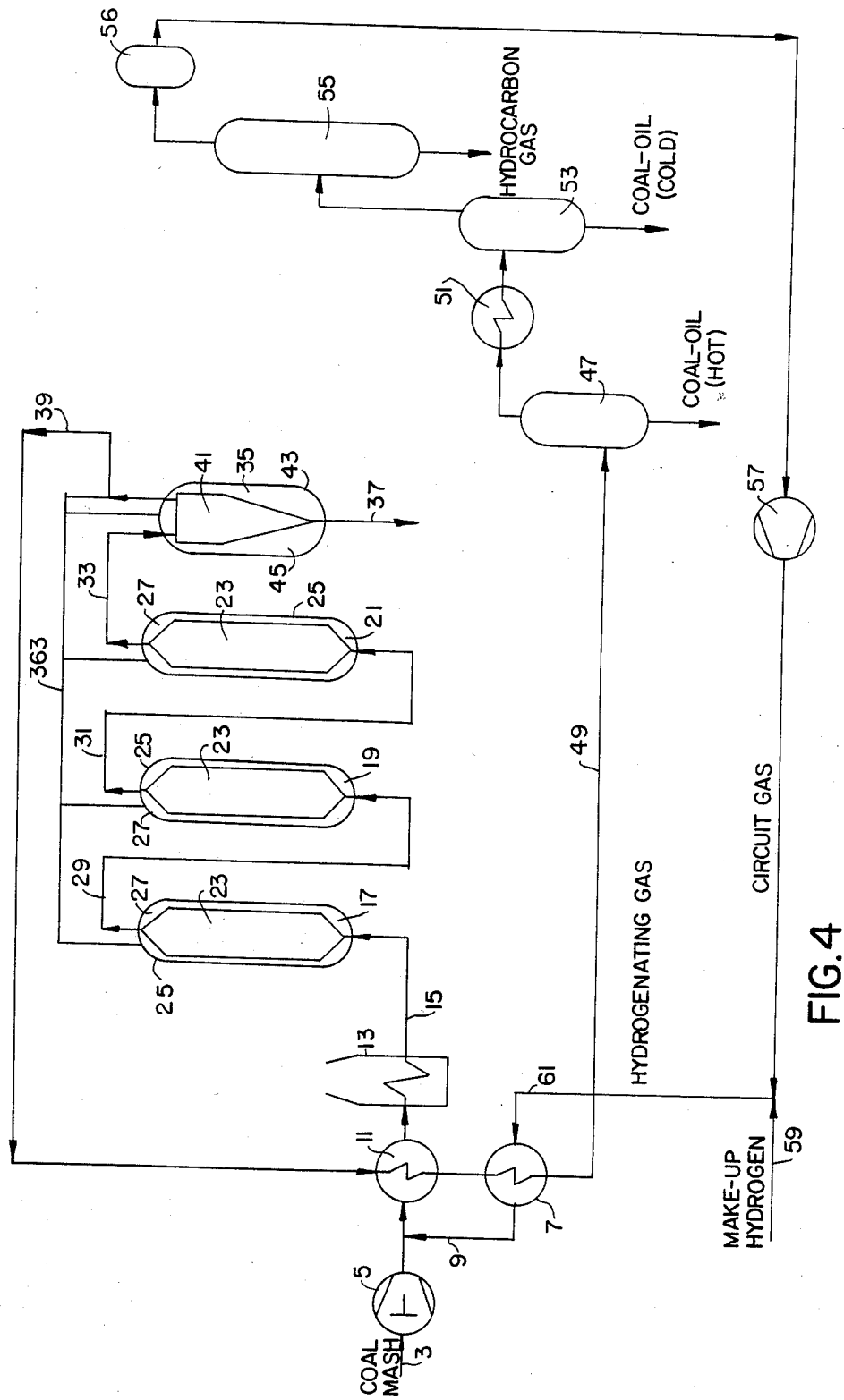

In accordance with the present invention, the interconnecting of the pressure protection for the interior casing of the reactors is effected via a manifold which is in communication with an actual process gas/vapor path. As a result, solids and, if such be the case, oils, are separated in the precipitators, and the annular space in the reactors, so that the process-conditioned pressure changes are simultaneously balanced therebetween. The basic operations of a coal-oil installation will be described in conjunction with FIG. 1 as will be the basic teachings of this invention. The alternative embodiments illustrated in FIGS. 2, 3 and 4 show further techniques by which the principles of this invention can be carried out.

Figure 1:
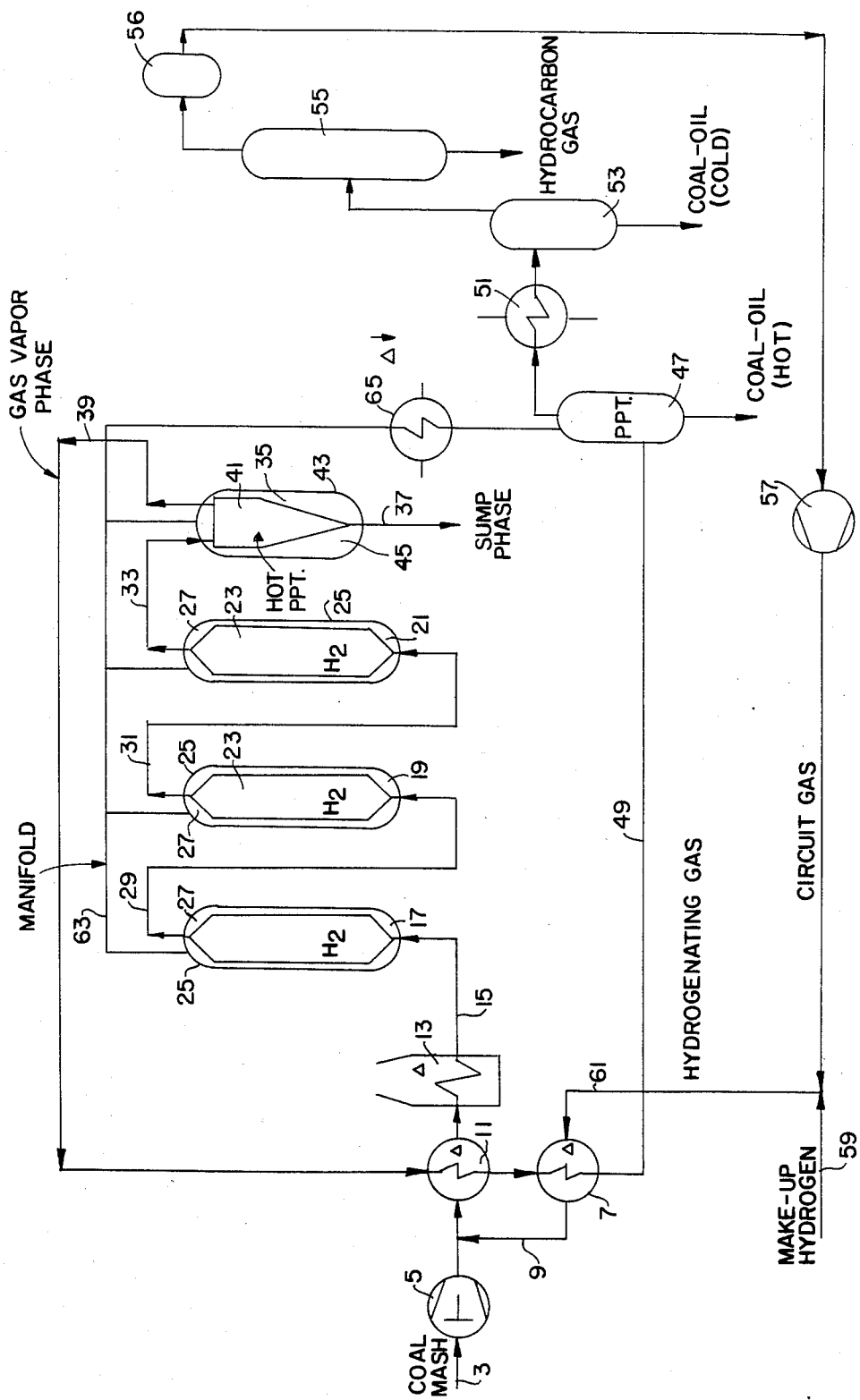
FIG. 1 is a flow diagram of a coal-oil installation with several series connected precipitators and a compressor incorporating the teaching of this invention.

FIG. 1 illustrates a procedure in accordance with the present invention for interconnecting high pressure reactors in a coal hydrogenation installation. A coal mash, which comprises dried coal and a process solvent or oil, is combined and by means of line 3, enters a high pressure pump 1 where it is subjected to a pressure of approximately 320 bars. The hydrogenating gas which is partially preheated in a heat exchanger 7 is conveyed from the heat exchanger 7 via line 9 to the coal mash prior to its introduction in the system. The hydrogenating gas is fed into the pressurized coal mash at a pressure of approximately 320 bars. The three-phase mixture, consisting of solids comprising coal and a catalyst, oil and hydrogenating gas, is heated by means of the heat exchanger 11 and a terminal heater 13 to the temperature required for the initiation of the hydrogenation reaction within the reactors. This temperature is approximately 420° to 460° C. The three-phase reaction mixture flows from the heater 13 via line 15 to the first of several hydrogenation reactors 17, 19 and 21 which are connected in series. Each hydrogenation reactor includes an interior casing 23 which functions as a reaction vessel and an outer or external casing 25 which together with the internal casing 23 defines therebetween an annular chamber 27. The three-phase reaction mixture flows first from line 15 through reactor vessel 17 and is discharged therefrom via line 29 through which it is conveyed to the second reactor vessel 19. Line 31 conveys the three-phase reaction mixture from reactor vessel 19 to reactor vessel 21. Having thus passed through several hydrogenating reactors, the three-phase reaction mixture is conveyed via line 33 into the hot precipitator 35. The sump phase consisting of high boiling oils and solids is drawn off from the bottom of the hot precipitator 35 via line 37. From the top of the reactor, via line 39, there is drawn off the gas/vapor phase comprising excess hydrogenating gas, reaction gases and vapor-form coal oil. The hot precipitator also comprises an internal casing 41 and an external casing 43 which define therebetween the annular chamber 45. The gas/vapor phase is partially cooled to approximately 240° C. by means of heat exchangers 11 and 7. As a result, part of the coal oil condenses from the gas/vapor phase. Both phases can be separated out by means of a precipitator 47 which is in communication with heat exchanger 7 by means of line 49. The gas/vapor phase is cooled by means of cooler 51 to approximately the temperature of the environment, i.e., 40° C., as a result of which the rest of the coal-oil condenses out of this phase. The separation of the cold coal-oil from the remaining gases and vapor comprising the hydrogenating gas, hydrocarbon gas and residual gases is effected in a precipitator 53 which is in communication with the cooler 51. Residual hydrocarbon gases can be removed from the remaining gas by means of the scrubber 55. The remaining gas, after passing through a vessel 56 is compressed again to approximately 320 bars by means of a compressor 57 and serves the so-called circuit gas. After any required make-up hydrogen is introduced into the system at 59, the combined make-up hydrogen gas and compressed circuit gas is fed back again as hydrogenating gas to the beginning of the process through the heat exchanger 7 via line 61.

The improved process according to the present invention for the pressure protection of the interior vessel or inner casing of the several reactors 17, 19 and 21 and of the hot precipitator 35 is effected via a manifold 63 which is in communication with the suction side or the negative side of the compressor 57. More specifically, the manifold 63 is in communication, either directly or indirectly, with the gas/vapor phase which is drawn from the top of the precipitator 35.

As can be seen in FIG. 1, the manifold is in communication with the head of the precipitator 47 in which the hot gas/vapor component drawn from the precipitator 35 is separated out. In this arrangement, it has been found advantageous to prevent the condensation of the coal-oil contained in the oil vapor, drawn off through the manifold 63, and the accumulation of that condensate in the pipes through the use of heated pipes or by means of a cooler 65 which is disposed between the manifold and the precipitator 47.

As can be seen in FIG. 2, the manifold 163 is in communication with the head of the precipitator 153. In all other respects, the flow diagram of the conventional coal hydrogenation process shown in FIG. 2 functions identically with that described in FIG. 1. In FIG. 3, the manifold 263 which connects the annular chambers of each of the reactor vessels and the hot precipitator is in direct communication with the suction side of the compressor 57. Here again, the hydrogenation process functions are described in connection with FIG. 1. The technological basis for the connecting of a manifold in the path between the head of the hot precipitator 35 and the suction side of the compressor 57 resides in the fact that with the coal hydrogenation as described herein, the loss in pressure between the reactors 17, 19 and 21 and the precipitators 47, 53 and 55 is relatively small, approximately 3-5 bars. As a result, adequate simultaneous pressure equalization sets in between the interior chamber of the reactor which defines the reaction vessel and the annular space of each reactor without additional control devices. It should be pointed out that this would not be the case if the manifold were established between the pressure side of the compressor 57 and the annular spaces of the reactors and hot precipitators. This is because the consequence of heating the three-phase mixture with its greatly increased viscosity due to coal swelling which takes place during hydrogenation of the coal, is a relatively large loss in pressure in the range of 15 to 20 bars. The aforementioned values for the loss in pressure apply to normal operating conditions.

Large pressure drops can occur in the reactor in the event of an accident or emergency. Such a drop can take reaction pressure from approximately 300 bars to about 130 bars within 5 minutes in the event of an emergency stress release during coal hydrogenation. Rapid pressure increases of a comparable order do not occur since, when the reactor is overheated, the emergency stress release is effected quite promptly. While, during normal or quasi stationary operations, the reactor's interior vessel or inner casing is held under a low over-pressure by means of the manifold of this invention, a small over-pressure will set in on the reactor's inner vessel in the event of a rapid release of pressure. This could occur, for example, in the event of an emergency stress relief. Through the process of this invention, no large pressure load occurs on one side of the inner vessel, and as a result, the inner vessel of the reactors and hot precipitator need not be manufactured from extremely heavy gauge material. In other words, through the implementation of the teachings of this invention, the walls of the inner casing of each of the reactor's vessels and the hot precipitator can be made of relatively thin material.

As can be seen in FIG. 4, in principle, the manifold 363 which interconnects the annular chambers of the reaction vessels and the hot precipitator can also be connected to the head side output of the first hot precipitator 35. Through this embodiment of the invention, the pressure difference between the inner chamber of each vessel and the annular space is still further reduced. Moreover, a two-phase flow which is free of solids can then occur in the manifold, so that liquid also arrives in the annular space. In such an embodiment, if need be, actual processed liquid can also serve as a supporting medium within the annular space of each reactor.

What has been described is a technique for interconnecting thermally and pressure-stressed multi-phase reactors, especially hydrogenating reactors in the sump phase.

The invention, as described hereinabove in the context of a preferred embodiment, is not to be taken as limited to all of the provided details thereof, since modifications and variations thereof may be made without departing from the spirit and scope of the invention.

1. In a high pressure coal hydrogenation process in which multi-phase reaction products flow through at least one hydrogenation reactor and are then cooled in a hot precipitator having a first output of a first phase comprising solids and condensed reaction products and a second output comprising a second phase of residual gas and vapors, said at least one reactor comprising an internal casing which forms a reaction chamber, and an external pressure casing in a spaced relation with the internal casing and defining therebetween a generally annular chamber, and said hot precipitator comprising an internal casing which forms a reaction chamber and an external pressure casing in a spaced relation with the internal casing and defining therebetween a generally annular chamber, an improvement for the pressure protection of the internal casings which form the reaction chambers in both said at least one reactor and said hot precipitator comprising the steps of establishing an interconnection between the annular chamber of each said at least one reactor, and the annular chamber of said hot precipitator and the second phase residual gas and vapor output of said hot precipitator via a manifold; and establishing pressure equilibrium between the annular chambers and the second phase of the residual gas and vapor output of said hot precipitator wherein processed conditioned pressure changes are simultaneously balanced between the interior casings which form the reaction chambers and the annular chamber surrounding the reaction chambers.

2. The process according to claim 1 wherein the second phase output of the hot precipitator comprising gas and vapors is conveyed to at least one further precipitator, the improvement wherein the manifold interconnecting the hydrogenation reactors and the hot precipitator is in communication with the gas/vapor path of said further precipitator.

3. The improved process according to claim 1 wherein the second phase output comprising residual gas and vapor from the hot precipitator is conveyed to a second precipatator and third precipitator for the extraction of coal-oil therefrom, the improvement wherein the manifold interconnecting the hydrogenation reactors and the hot precipitators is in communication with said second precipitator.

4. The improved process according to claim 1 wherein the second phase output comprising residual gas and vapor from the hot precipitator serves at least in part as the circuit gas for the hydrogenation process and wherein said circuit gas is compressed to a predetermined reaction pressure by means of a compressor, the improvement wherein the manifold interconnecting the hydrogenation reactors and hot precipitator is in communication with the suction side of said compressor.

* * * * *